(12) United States Patent
Okner et al.

(10) Patent No.: US 9,444,756 B2
(45) Date of Patent: Sep. 13, 2016

(54) PATH AGGREGATION GROUP MONITOR

(71) Applicant: Broadcom Corporation, Irvine, CA (US)

(72) Inventors: Leonid Okner, San Jose, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 236 days.

(21) Appl. No.: 14/036,531

(22) Filed: Sep. 25, 2013

(65) Prior Publication Data

US 2015/0016258 A1  Jan. 15, 2015

Related U.S. Application Data

(60) Provisional application No. 61/844,085, filed on Jul. 9, 2013.

(51) Int. Cl.
| | |
|---|---|
| *H04L 12/28* | (2006.01) |
| *H04L 12/891* | (2013.01) |
| *H04L 12/825* | (2013.01) |
| *H04L 12/801* | (2013.01) |
| *H04L 12/835* | (2013.01) |
| *H04L 12/823* | (2013.01) |

(52) U.S. Cl.
CPC ............ *H04L 47/41* (2013.01); *H04L 47/266* (2013.01); *H04L 47/30* (2013.01); *H04L 47/32* (2013.01); *H04L 47/33* (2013.01); *Y02B 60/33* (2013.01)

(58) Field of Classification Search
CPC ...... H04L 47/10; H04L 47/193; H04L 47/22
USPC .......................................................... 370/235
See application file for complete search history.

(56) References Cited

U.S. PATENT DOCUMENTS

| | | | | |
|---|---|---|---|---|
| 2005/0105469 A1* | 5/2005 | Hao | .................. | H04L 43/16 370/235 |
| 2008/0298236 A1* | 12/2008 | Ervin | .................. | H04L 47/10 370/232 |
| 2011/0063979 A1* | 3/2011 | Matthews | ............. | H04L 45/302 370/237 |

* cited by examiner

*Primary Examiner* — Mark Rinehart
*Assistant Examiner* — Matthew Hopkins
(74) *Attorney, Agent, or Firm* — Brinks Gilson & Lione (57) ABSTRACT

A network device monitors a path aggregation group. The network device may monitor path selection for network traffic (e.g., packets) communicated through the path aggregation group. During a monitoring period, the network device may obtain a path selection indication that a network packet has been selected for communication through the path aggregation group and specifically a first path in the path aggregation group. The network device may update a path entry associated with the first path in the path aggregation group.

21 Claims, 5 Drawing Sheets

PATH AGGREGATION GROUP MONITOR

PRIORITY CLAIM

This application claims priority to U.S. Provisional Application Ser. No. 61/844,085, filed Jul. 9, 2013, titled "Path Aggregation Group Monitor," which is incorporated herein by reference in its entirety.

TECHNICAL FIELD

This disclosure relates to networking. This disclosure also relates to monitoring communication of network traffic.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to path aggregation groups. A path aggregation group may refer to a set of paths through which a network device may route network traffic to a destination. In that regard, the network device may select a particular path within a path aggregation group to use for communicating a packet towards the destination. Network devices may configure any number of path aggregation groups according to any number of configuration parameters or factors. Path aggregation groups may be used in various network technologies, topologies, standards, or protocols, including at multiple layers in the Open Systems Interconnection (OSI) model. An Equal Cost Multi-Path (ECMP) group is one example of path aggregation group at the network layer of the OSI model and a trunk group provides one example of a path aggregation group at the data layer of the OSI model.

Improvements in identifying and managing of network flows may help improve high speed data networks. The techniques and systems described below may facilitate monitoring path selection for network traffic communicated through a path aggregation group. For example, the techniques and systems described below may facilitate monitoring performance and path selection of multiple path aggregation groups within a network device, including multiple path aggregation groups that share one or more common paths members, next-hop devices, or other commonalities. By doing so, unbalanced network loads or other network performance anomalies caused by path selection in aggregation groups may be detected, evaluated, and addressed.

Figure 1:
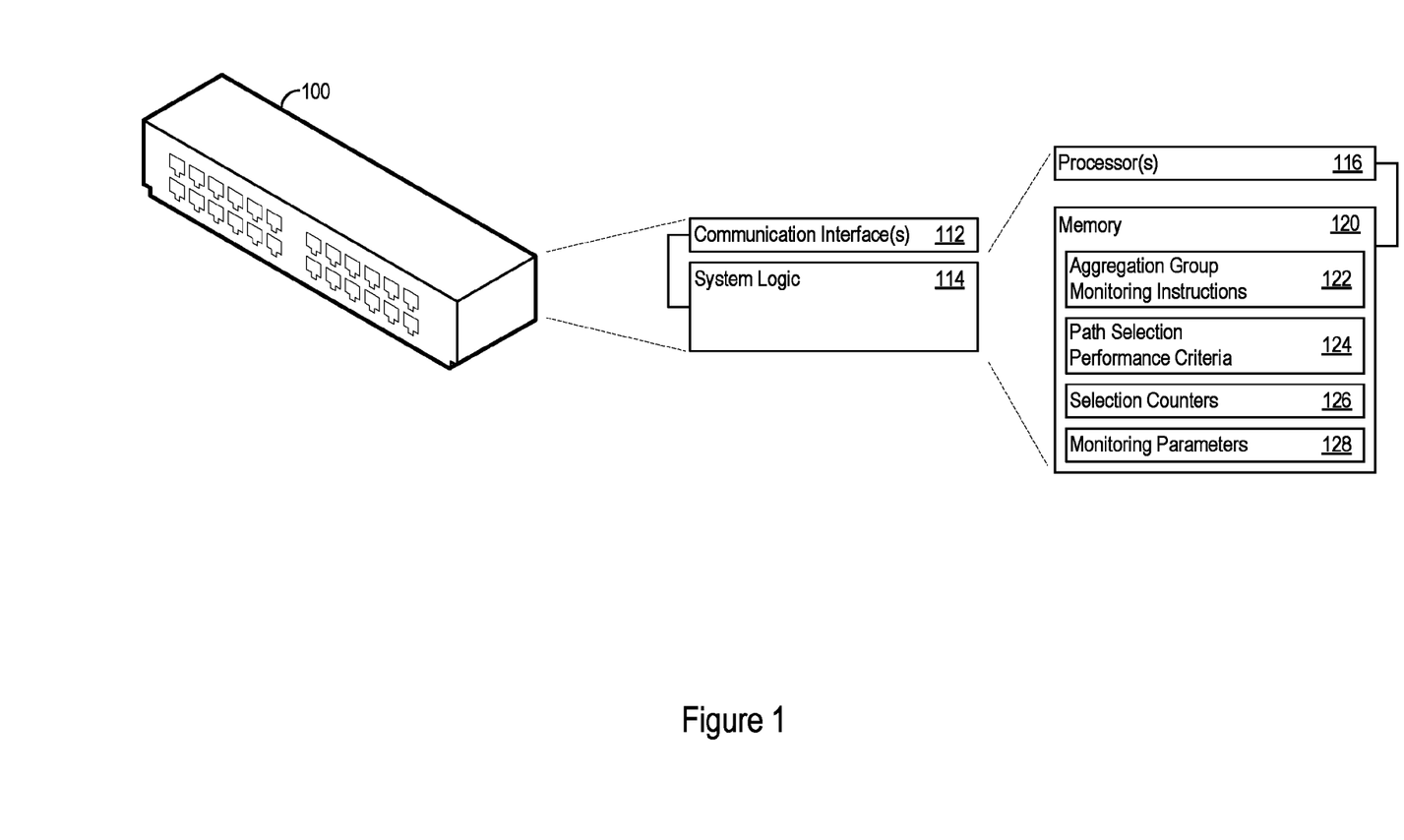
FIG. 1 shows an example of a network device that implements path aggregation group monitoring.

FIG. 1 shows an example of a network device 100 that implements path aggregation group monitoring. The network device 100 may be any device that communicates or routes data. As examples, the network device 100 may be a switch, router, gateway, network bridge, or any other type of network device that processes or routes network traffic such as packets.

The network device 100 includes one or more communication interfaces 112. The communication interface 112 may be configured to communicate according to one or more communication modes, e.g., according to various communication techniques, standards, protocols, or across various networks or topologies. The communication interface 112 may support communication according to particular quality-of-service (QoS) techniques, encoding formats, through various physical (PHY) interfaces, and more. For example, the communication interface 112 may communicate according to any of the following network wired or wireless technologies, topologies, mediums, or standards: Ethernet, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, Universal Mobile Telecommunications System (UMTS), GSM (R) Association, Long Term Evolution (LTE) (TM), or more), WiFi (including 802.11 a/b/g/n/ac), WiMAX, Bluetooth, WiGig (e.g., 802.11ad), and others. As one example, the communication interface 112 may include one or more data ports, and a data port may correspond to one or more paths through which data is communicated through (e.g., to and/or from) the network device 100.

The network device 100 includes system logic 114. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the network device 100. In that regard, the system logic 114 may include logic that facilitates, as examples, running applications; saving and retrieving application data; receiving, processing, and routing packet data; and establishing, maintaining, and terminating network connections.

As described in greater detail below, the system logic 114 may monitor path selection for network traffic communicated through a path aggregation group. The system logic 114 may include one or more processors 116 and memories 120. The memory 120 stores, for example, aggregation group monitoring instructions 122 that the processor 116 executes to carry out any of the monitoring or processing functionality described below. The path selection performance criteria 124 may provide one or more criterion through which the system logic 114 evaluates path selection data obtained from monitoring path selections for a path aggregation group. The selection counters 126 may implement one or more data structures through which the system logic 114 may track path selections in the path aggregation group. The monitoring parameters 128 may provide and specify configuration and operating options for the system logic 114 for monitoring a path aggregation group.

Figure 2:
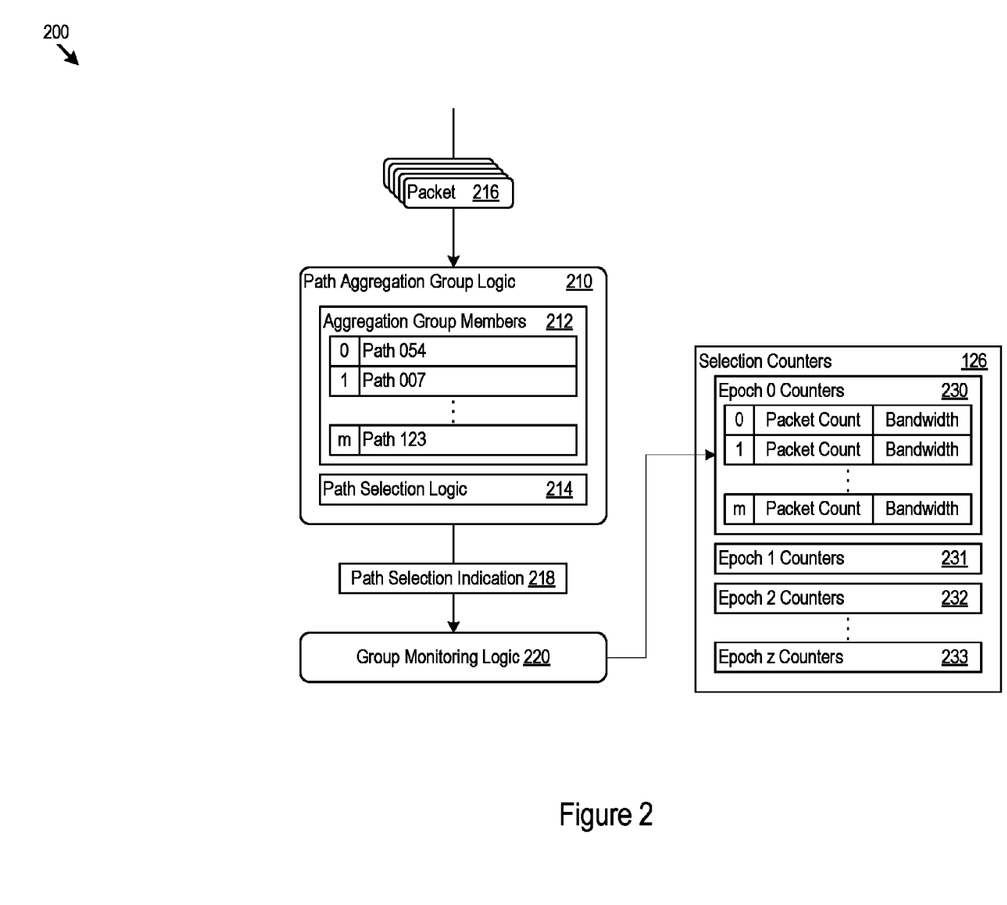
FIG. 2 shows an example of a system that implements path aggregation group monitoring.

FIG. 2 shows an example of a system 200 that implements path aggregation group monitoring. The system logic 114 may implement one or more portions of the system 200 to perform path aggregation group monitoring. The exemplary system 200 shown in FIG. 2 includes path aggregation group logic 210 and group monitoring logic 220.

The path aggregation group logic 210 may include, or be associated with, a particular path aggregation group. The path aggregation group may correspond to a particular OSI layer, and in that regard, the path aggregation group logic 210 may correspond to a particular OSI layer as well. The path aggregation group logic 210 may include a path aggregation group listing or table identifying aggregation group members, such as the aggregation group members table 212. The aggregation group members table 212 may identify a set of member paths belonging to the path aggregation group. The member paths may be identified according to a path number or other identification form. The member paths may correspond to a particular port or communication interface in the network device 100 or a next-hop device in a communication network, as examples. In the example shown in FIG. 2, the aggregation group members table 212 includes m+1 number of member paths indexed from 0 to 'm', including path 054 in index position 0, path 007 in index position 1, and path 123 in index position 'm'.

The path aggregation group logic 210 may include path selection logic 214. The path selection logic 214 may select one of the member paths of a path aggregation group to send network traffic, e.g., packets, through. The path selection logic 214 may apply one or more path selection algorithms for selecting a path from among the path aggregation group. As examples, the path selection logic 214 may apply a hash function computed on packet data or other meta-data from other packet forwarding logic in the network device 100, use an entropy value included in or associated with a packet, apply a random selection function, apply a modulo function to predetermined packet data or fields, and more. In some implementations, the path selection logic 214 selects a consistent path for packets in the same packet flow. The path selection logic 214 may also attempt to equally distribute network traffic amongst the member paths of the path aggregation group, e.g., equal distribution in terms of packet number or traffic bandwidth. Or, the path selection logic 214 may distribute the network traffic amongst the member paths in the path aggregation group in a weighted manner, applying greater or lesser weights to particular paths in the path aggregation group in distributing network traffic.

In operation, the path aggregation group logic 210 receives one or more packets 216 for communicating through the path aggregation group. For example, the path aggregation group logic 210 may receive a packet 216 from other forwarding logic in the network device 100. The network device 100 may include multiple path aggregation groups, and the forwarding logic may determine one of the multiple path aggregation groups through which to communicate the packet 216. In response to receiving the packet 216, the path selection logic 214 determines one of the member paths (e.g., as stored in the aggregation group members table 212) to communicate the packet 216 through. The path aggregation group logic 210 may forward the packet 216 to other logic in the network device 100 for sending through selected path, e.g., by sending the packet 216 to a queue or buffer of an outgoing data port in the network device 100 associated with selected path.

The group monitoring logic 220 monitors the path selection of network traffic communicated through a path aggregation group. The group monitoring logic 220 may, for example, obtain path selection data for the path aggregation group and evaluate the performance of one or more path selection algorithms applied by the path aggregation group logic 210. In some implementations, the group monitoring logic 220 monitors path selection for a particular path aggregation group associated with the group monitoring logic 220, but does not monitor path selection for other path aggregation groups in the network device 100 that are not associated with the group monitoring logic 220. Put another way, the system logic 114 may configure dedicated group monitoring logic 220 for a particular path aggregation group in the network device 100.

The group monitoring logic 220 may receive a path selection indication 218 sent by the path aggregation group logic 210. The path selection indication 218 may identify a selected path from among a path aggregation group for network traffic, e.g. the selected path for communicating the packet 216. The path selection indication 218 may, for instance, identify an index number or value for the selected path, which may correspond to the index of the selected path in the aggregation group members table 212. The path selection indication 218 may identify additional information as well, such as specifying any number of packet characteristics of the packet 216, such as the packet size. The path selection indication 218 may additionally or alternatively specify whether the packet 216 has been dropped, whether the packet 216 contains a control message, or other data, allowing the group monitoring logic 220 to monitor additional aspects of the network traffic communicated through the path aggregation group. In some implementations, the group monitoring logic 220 receives a path selection indication 218 on a per-packet basis for packets handled by the path aggregation group logic 210.

The group monitoring logic 220 may monitor path selection of packets communicated through a path aggregation group using the selection counters 126. The selection counters 126 may be implemented as any type of data structure to store path selection data. As one implementation, the selection counters 126 may include one or more sets of counter entries through which the group monitoring logic 220 tracks path selection by the path aggregation group logic 210.

The group monitoring logic 220 may monitor path selection for a path aggregation group during one or more predetermined time intervals, e.g., one or more epochs of time. When monitoring path selection for the path aggregation group in multiple epochs, the group monitoring logic 220 may use multiple sets of counters corresponding to the multiple epochs. In the example shown in FIG. 2, the selection counters 126 include 'z' number of counter sets, including the counter sets labeled as epoch 0, counters 230, epoch 1, counters 231, epoch 2, counters 232, and epoch z counters 233. Each of the multiple sets of counters (e.g., epoch counters) may correspond to a particular epoch during which the group monitoring logic 220 monitors path selection of the path aggregation group.

The number counter entries (or path entries) in a set of counters in the selection counters 126 may correspond to the number of paths in a path aggregation group monitored by the group monitoring logic 220. To illustrate, in FIG. 2, the path aggregation group logic 210 includes 'm' number of member paths. Accordingly, a set of counters labeled as epoch 0, counters 230 in FIG. 2 includes 'm' number of path entries, e.g., one for each path currently part of the monitored path aggregation group (e.g., currently active paths). As another option, a set of counters in the selection counters 126 may include a number of path entries corresponding to the maximum possible number of active paths in the path aggregation group, which may be greater than the number of currently active paths in the path aggregation group.

In operation, and in response to receiving a path selection indication 218, the group monitoring logic 220 may identify a particular set of counters corresponding to a particular epoch, e.g., by identifying the epoch 1, counters 231 during a predetermined time period corresponding to epoch 1. The group monitoring logic 220 may identify a path entry in the particular set of counters corresponding to the selected path of the path aggregation group. For instance, the group monitoring logic 220 may identify the path entry according to the index of the selected path specified in the path selection indication 218.

A path entry in the selection counters 126 may store various path selection statistics or data. The path entry may store path selection statistics and data for network traffic communicated through a particular path aggregation group. A path entry may include a packet count field, a bandwidth field, or other fields. The packet count field may indicate a number of the packets communicated through the respective path associated with the path entry, e.g., during the particular epoch. The bandwidth field may indicate a bandwidth or data amount (e.g., number of bytes) communicated through the respective path during the particular epoch. Upon receiving a path selection indication 218, the group monitoring logic 220 may update the identified entry by incrementing the values of the packet count field and/or the bandwidth field. Thus, the group monitoring logic 220 may collect path selection data using the selection counters 126.

As discussed above, the group monitoring logic 220 may monitor path selection for a path aggregation group during multiple epochs. By monitoring path selection in multiple epochs, the group monitoring logic 220 may reduce statistical errors or anomalies that may distort individual samples. The multiple epochs may also be relatively short in duration (e.g., on the order microseconds or milliseconds) to reduce the presence of statistical anomalies. The multiple epochs may be non-consecutive and vary in length, thus providing greater flexibility in monitoring the path aggregation group.

The group monitoring logic 220 may access the monitoring parameters 128 to determine timing information associated with one or more epochs, e.g., start time information, stop time information, duration information, etc. In that regard, the group monitoring logic 220 may determine epochs that occur in the future as specified by the monitoring parameters 128. As another option, the group monitoring logic 220 may receive one or more timing indication messages containing the timing information for one or more epochs. For instance, the network device 100 may receive the timing indication message from a network administrator or management entity of a communication network the network device 100 is linked to.

The monitoring parameters 128 may specify a periodic or aperiodic monitoring timing scheme. For instance, the monitoring parameters 128 may specify epochs as a sampling rate, e.g., as a set number of milliseconds of each second. The monitoring parameters 128 may specify epochs in response to particular events, such as identifying congestion in the network device 100 or upon identifying a network failure. The group monitoring logic 220 may enter an active monitoring state (e.g., to monitor the path selection of a path aggregation group) during the monitoring periods (e.g., epochs) specified by the timing information. During non-monitoring periods, e.g., time periods not within an epoch, the group monitoring logic 220 may enter an inactive state during which the group monitoring logic 220 does not monitor the path selection of the path aggregation group logic 210.

The group monitoring logic 220 may monitor path selection for particular types of traffic communicated through a path aggregation group. In that regard, the group monitoring logic 220 may exclude particular types of data from the path selection data monitored by the group monitoring logic. The group monitoring logic 220 may exclude from the path selection data, as examples path selection for, dropped network traffic, network traffic of a particular traffic class or priority, etc. The group monitoring logic 220 may forego incrementing a corresponding selection counter for path selections of excluded traffic types, which may be specified or configured according to the monitoring parameters 128.

Figure 3:
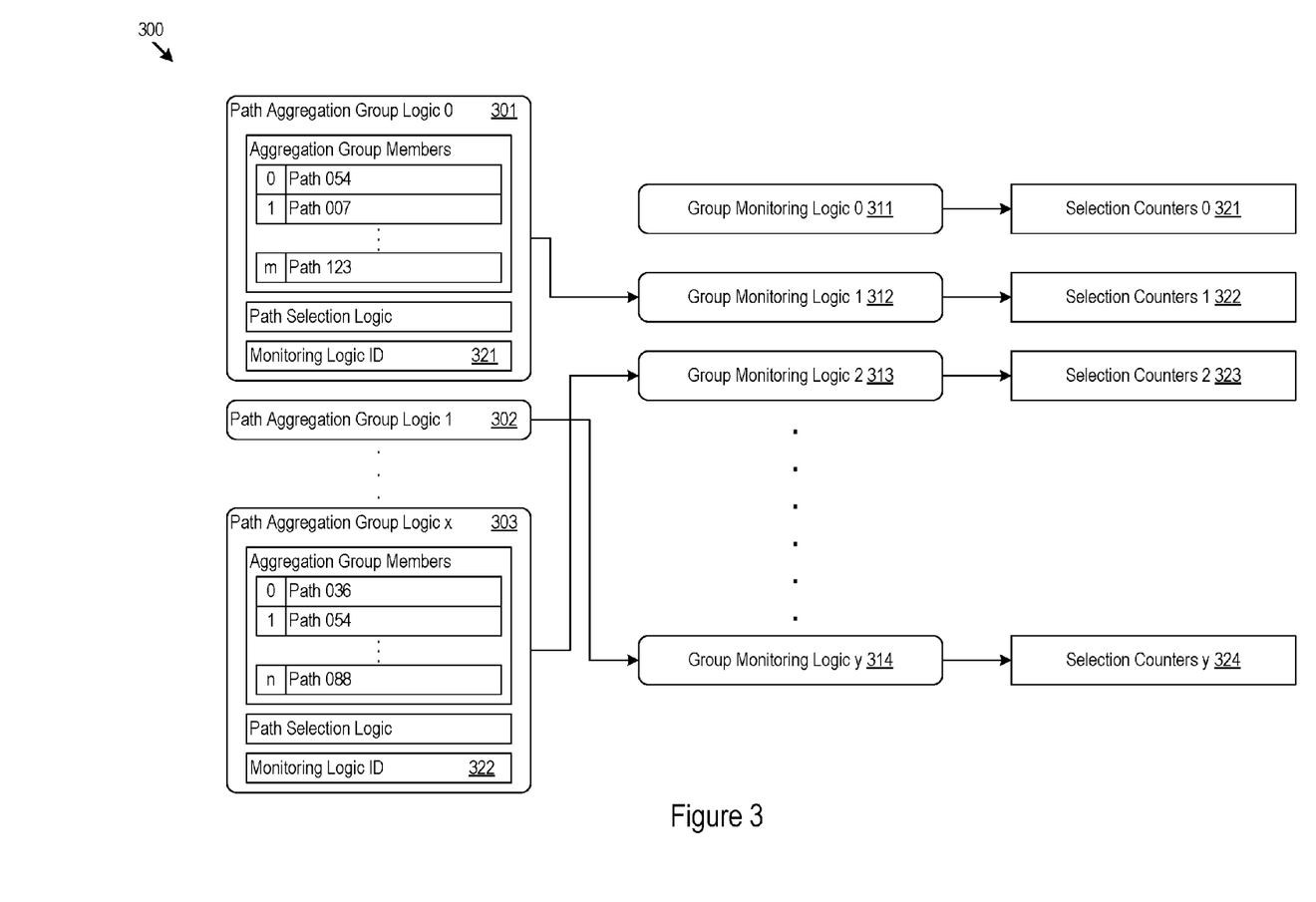
FIG. 3 shows an example of a system that implements path aggregation group monitoring for multiple path aggregation groups.

FIG. 3 shows an example of a system 300 that implements path aggregation group monitoring for multiple path aggregation groups. The system logic 114 may implement one or more portions of the system 300 to perform path aggregation group monitoring. The exemplary system 300 shown in FIG. 3 includes multiple instances of path aggregation group logic, including those labeled as path aggregation group logic 0 301, path aggregation group logic 1 302, and path aggregation group logic 303. Each respective instance of path aggregation group logic may be associated with a particular path aggregation group. Put another way, the aggregation group members of the instances of path aggregation group logic may differ, and the network device 100 (e.g., other packet processing or forwarding logic) may distribute a packet among the path aggregation group logic according to a particular path aggregation group through which the packet is to be communicated through.

The exemplary system 300 also includes multiple instances of group monitoring logic, including those labeled as group monitoring logic 0 311, group monitoring logic 1 312, group monitoring logic 2 313, and group monitoring logic y 314. In some implementations, group monitoring logic may be implemented as on-chip hardware in the network device 100, which may allow for faster processing and monitoring than another possible implementation of the group monitoring logic as software. The multiple instances of monitoring logic may each be in communication with respective selection counters. As seen in FIG. 3, group monitoring logic 0 311 is in communication with and associated with selection counters 0 321, group monitoring logic 1 312 is in communication with and associated with selection counters 1 322, and so on.

A particular instance of path aggregation group logic may be associated with a particular instance of group monitoring logic. The association between path aggregation group logic and group monitoring logic may be specified according to a monitoring logic identification field included in the path aggregation group logic, which may provide an identification of a particular group monitoring logic associated with the path aggregation group logic. In this way, the path aggregation group logic may determine which particular group monitoring logic to send path selection indications 218 to. To illustrate, in FIG. 3, path aggregation group logic 0 301 includes a monitoring logic identification field 321 specifying group monitoring logic 1 312. Accordingly, path aggregation group logic 0 301 sends path selection indications 218 to group monitoring logic 1 312 and group monitoring logic 1 312 monitors the path selection for the path aggregation group associated with path aggregation group logic 0. In a similar way, path aggregation group logic 1 302 is associated with group monitoring logic y 314 and path aggregation group logic x 303 is associated with group monitoring logic 2 313. Some group monitoring logic may not be associated with any path aggregation groups or path aggregation group logic, such as group monitoring logic 0 311 in FIG. 3. This scenario may occur when the network device 100 includes a greater number of group monitoring logic, e.g., excess dedicated group monitoring hardware, than path aggregation groups or corresponding group aggregation logic.

The system logic 114 may configure the same path to be part of multiple path aggregation groups in the network device 100. For example, in FIG. 3, path 054 is part of the aggregation group members table for both path aggregation group 0 301 (positioned at index 0) and path aggregation group x 303 (positioned at index 1). As such, the system logic 114 may monitor network traffic communicated through a particular path on a per path aggregation group basis and at a finer granularity than the total network traffic communicated through the particular path as a whole. For example, forwarding logic in the network device 100 may determine that a first packet be communicated through a path aggregation group handled by path aggregation group logic x 303. The path aggregation group logic x 303 may select path 054 to communicate the first packet through. In this example, the group monitoring logic 2 313 (associated with path aggregation group logic x 303) may update the path entry for path 054 in the selection counters 2 323, e.g., by updating one or more counter values such as a packet count value, a bandwidth value, or a total data value. However, the group monitoring logic 1 312, which also includes path 054, may forego updating the path entry for path 054 in selection counters 1 322 even though the first packet is communicated through path 054, as the first packet was not communicated through the path aggregation group associated with path aggregation group logic 0 301. Thus, the system logic 114 may aggregate path selection data for a particular path and determine, for the particular path, the proportion of the network traffic (e.g., number of packets, bandwidth, total data, etc.) communicated through the particular path that is attributable to one or more path aggregation groups that include the particular path.

As another illustration, path 054 may be associated with a particular data port in the network device 100, and the system logic 114 may monitor network traffic communicated through the particular data port on a per path aggregation group basis. That is, the system logic 114 may determine the portion of data communicated through the particular data port attributable to multiple path aggregation groups that include the particular data port, including the number of packets and bandwidth attributed to each of the respective multiple path aggregation groups including the particular data port. Thus, the system logic 114 may monitor data communicated through the particular data port at a finer granularity than the total number of packets and/or bandwidth of network traffic communicated through the port as a whole.

Figure 4:
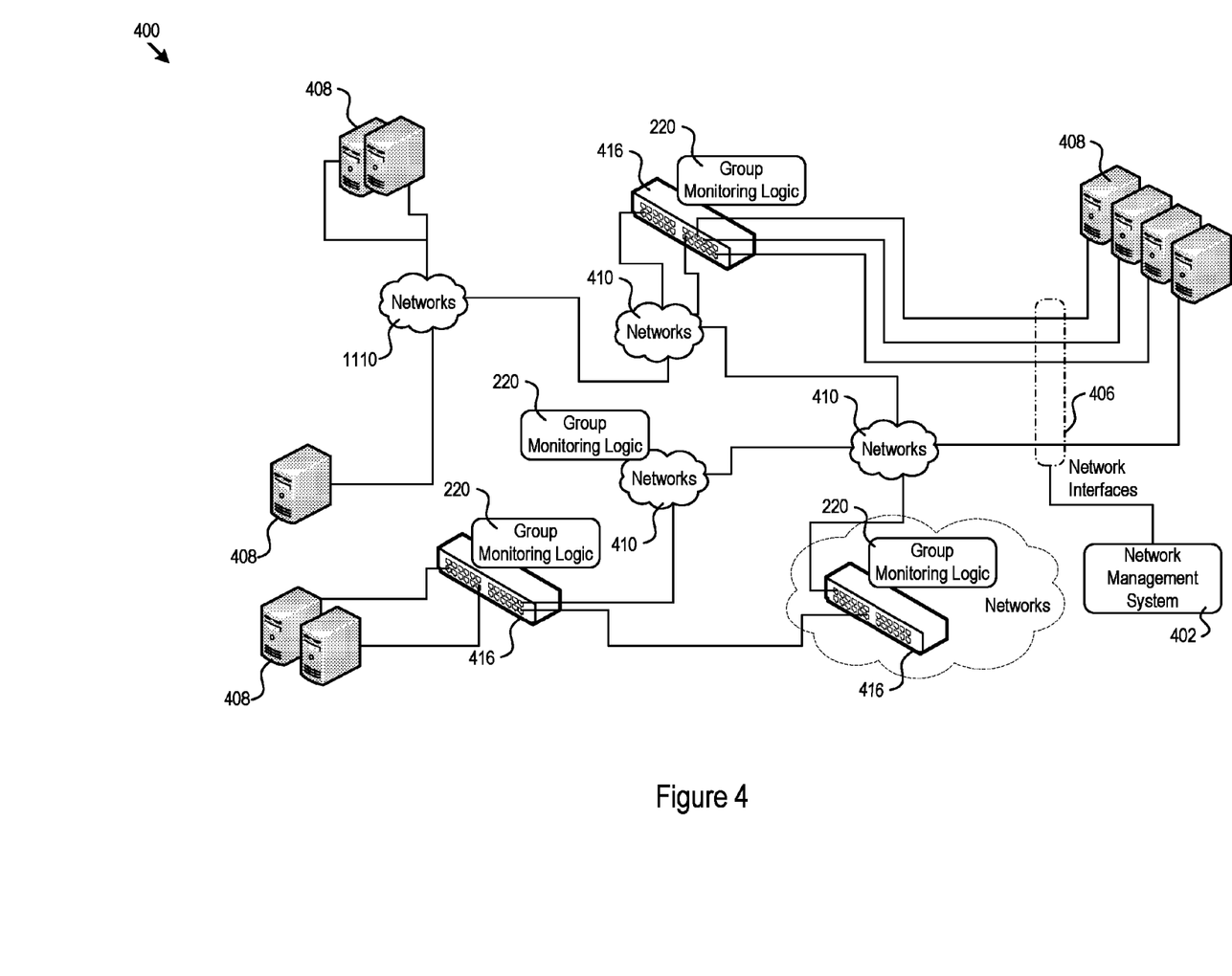
FIG. 4 shows an example of a communication system that implements path aggregation group monitoring across multiple devices.

FIG. 4 shows an example of a communication system 400 that implements path aggregation group monitoring across multiple devices. The communication system 400 includes edge devices 408. The edge devices 408 may be any type of computing device, including as examples application servers, data servers, personal computing devices (e.g., laptops, computers, mobile phones, personal digital assistants, tablet devices, etc.). The communication system 400 includes intermediate networks 410, which may include any number of intermediate network devices, and routing devices 416, which may include routers, switches, blades, network access devices, or any other network device that routes network traffic using path aggregation groups. The communication system 400 includes a network management system 402 which may communicate with the routing devices 416 or networks 410 through one or more network interfaces 406.

At various points in the communication system 400, one or more instances of group monitoring logic 220 is present, which may implement any of the path selection monitoring functionality as described above or below. In the example shown in FIG. 4, the routing devices 416 include group monitoring logic 220. The networks 410 also include group monitoring logic 220, which may be present inside of any switch, router, or other network device 100 in the networks 410. The devices 416 and the devices in the networks 416 may configure their own respective path aggregation groups, which vary from device 416 to device 416 and network 410 to network 410.

The monitoring logic 220 in the devices 416 and networks 410 may monitor path selection for one or more path aggregation groups configured within the respective devices 416 or networks 410. The monitoring logic 220 of the devices 416 and networks 410 may respectively monitor path aggregation groups independently or in a coordinated matter. For example, the network management system 402 may send a monitoring initiation message, e.g., epoch timing indications, to one or more devices 416 or networks 410 in the communication system 400. The monitoring initiation message may specify a consistent time to monitor path selection of aggregation group(s) by the devices 416 and networks 410, e.g., simultaneously during a set time period. The network management system 402, devices 416, and networks 410 may synchronize timing of aggregation group monitoring using any number of time synchronization techniques across multiple devices, e.g., according to the Institute of Electrical and Electronic Engineers (IEEE) 1588 standard.

As another example, the network management system 402 or any of the devices 416 or networks 410 may send a control or marker packet across the communication network 400, and monitoring logic 220 of a respective device 416 or network 410 may perform path aggregation group monitoring in response to receiving the control packet. In this example, the monitoring may take place in a cascaded fashion as the control or marker packet is communicated across the communication system 400.

The network management system 402 may collect path selection statistics from the devices 416 and networks 410, allowing for a system-wide view of path selection in path aggregation groups as monitored by the group monitoring logic 220. The network management system 402 may obtain real-time system performance by collecting path selection statistics from the devices 416 and networks 410. The network management system 402 may, for example, determine the cause or source of congestion in the network by identifying one or more path aggregation groups that are overloading paths.

Figure 5:
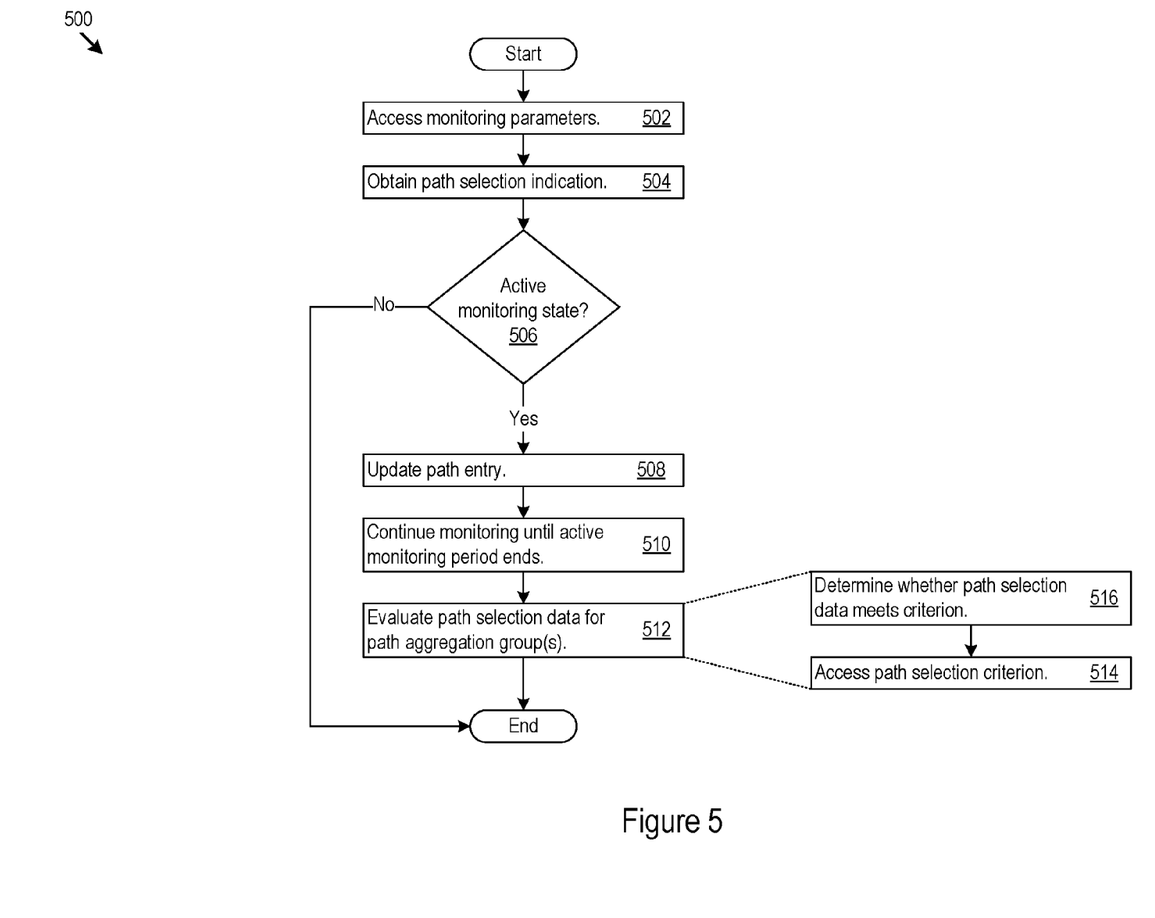
FIG. 5 shows an example of logic for monitoring a path aggregation group.

FIG. 5 shows an example of logic 500 for monitoring a path aggregation group. The system logic 114 or the group monitoring logic 220 may implement the logic 500 in any combination of hardware, software, or firmware. For example, the system logic 114 may implement the logic 400 in software as the aggregation group monitoring instructions 122.

The system logic 114 may access the monitoring parameters 128 (502) and obtain a path selection indication 218 (504). The path selection indication 218 may indicate that a packet has been selected for communication through a particular path aggregation group and specifically through a selected path in the path aggregation group. For example, the system logic 114 may receive the path selection indication 218 from path aggregation group logic associated with the path aggregation group. Before, during, or after receiving the path selection indication 218, the system logic 114 may determine whether the system logic 114 is in an active monitoring state (506). In doing so, the system logic 114 may determine whether the path selection indication 218 was received by the system logic 114 during an active monitoring time period or whether the packet itself was received by the network device 100 during the active monitoring period, for example.

The system logic 114 may determine an active monitoring period in various ways. For example, the system logic 114 may access the monitoring parameters 128 to determine predetermined time periods, e.g., epochs, during which the system logic 114 performs path aggregation group monitoring. The system logic 114 may determine an active monitoring period as a particular time period following the detection of congestion in the network device 100. The system logic 114 may identify congestion when determining that the fill level of one or more buffers in the network device 100 has exceeded a congestion threshold, upon sending one or more pause frames to other devices, or in response to sending or receiving explicit congestion notifications (ECN) or other congestion notifications. As another option, the system logic 114 may determine an active monitoring period as a particular time period following identifying a critical failure in the network device 100 or a communication network, in response to receiving an monitoring instruction from a network management device, as a time period following receiving a control or marker packet, by identifying a predetermined epoch time, receiving a digital word instruction to initiate path aggregation group monitoring, or in other instances.

When the system logic 114 determines it is in an active monitoring state, the system logic 114 monitors the path selection of the path aggregation group. In that regard, the system logic 114 collects path selection data for the path aggregation group during the active monitoring period. The system logic 114 may update a path entry in the selection counters 126 associated with the selected path specified in the selected path indication (508). The path entry may be specific to a particular monitoring period, e.g., epoch, during which the system logic 114 monitors the path aggregation group. The system logic 114 may, for example, increment a packet number value, bandwidth value, or total data value for the path entry. In similar way, the system logic 114 may update respective path entries for the path selection indications received by the system logic 114 during the active monitoring period. Accordingly, the system logic 114 may obtain path selection data for the path aggregation group during the active monitoring period. The system logic 114 may continue to monitor the path selection of the path aggregation group until the active monitoring period ends (510).

The system logic 114 may evaluate the path selection data (512) obtained by monitoring the path aggregation group. Additionally or alternatively, the system logic 114 may send the path selection data to an external monitoring service, e.g., to an analysis system that evaluates the path selection data. In some variations, the system logic 114 evaluates the path selection data during an inactive monitoring period, e.g., after an active monitoring period has ended. Doing so may allow the system logic 114 to evaluate a collected set of path selection data. The system logic 114 may evaluate path selection data obtained for multiple epochs by aggregating the path selection data collected during the multiple epochs.

The system logic 114 may evaluate the path selection data according to one or more path selection performance criterion 124. The path selection performance criteria 124 may specified or customized by a user, customer, network administrator, or other entity, for example through a user interface in the network device 100 or through one or more control messages received by the system logic 114, e.g., from a network management entity linked to the network device 100.

The system logic 114 may access the path selection performance criteria 124 (514) and determine whether the path selection data meets the path selection performance criteria 124 (514). The system logic 114 may determine whether the path selection criteria 124 are met based on path selection distribution in the path selection data. Path selection distribution may refer to the distribution of network traffic among the paths of a monitored path aggregation group, for example as measured in a number or percentage of packets, bandwidth, and/or total data size or amount.

Some examples of path selection performance criteria 124 are presented next. The system logic 114 may determine the path selection data fails the path selection criteria 124 when the path selection distribution for one or more paths in the monitored path aggregation group varies by more than a variance threshold from a target distribution. For example, the path selection performance criteria 124 may specify that the path selection distribution for a particular path in the path aggregation group not exceed or fall below a target distribution range, e.g., within 5% of the equal distribution percentage across the paths in the path aggregation group, within 7% of a weighted distribution percentage for the particular path, within a threshold number of packets of an equal packet distribution number across the paths in the path aggregation group, etc.

As another example, the path selection performance criteria 124 may specify that the path selection distribution for a first path in the path aggregation group not exceed the path selection distribution for a second path in the path aggregation group by a threshold amount. The path selection performance criteria 124 may require that the highest path selection distribution among the paths of a path aggregation group not exceed the lowest path selection distribution by a predetermined threshold amount, e.g., the respective path selection distribution be within 15% when measured according to distribution percentage, within a threshold number of packets, bandwidth, or data size, or according to any other amount threshold. The path selection performance criteria 124 may specify any number of additional or alternative criteria for evaluating the path selection data of a path aggregation group.

In some variations, the system logic 114 sends the path selection data to another entity for evaluation. For example, the system logic 114 may send the path selection data to a network administrator or management system, such as the network management system 402 shown in FIG. 4. The system logic 114 may send the path selection data to an analysis system or other analysis logic. These entities may apply any of the evaluation techniques or path selection performance criteria 124 described above.

The system logic 114 or system logic 114 may evaluate path selection data obtained for multiple (e.g., all) path aggregation groups in the network device 100. By evaluating the path selection data, including for multiple path aggregation groups, the system logic 114 may determine overutilization or underutilization of network paths and associated communication logic associated with the network paths, e.g., data ports in the network device 100. By monitoring the path selection for multiple path aggregation groups, the system logic 114 may also identify when one or more particular path aggregation groups have selected an overutilized or underutilized path, allowing the system logic 114 to pinpoint the cause of network congestion or other path selection effects at a path aggregation group level. By monitoring path aggregation groups, including path aggregation groups at different layers in the OSI model, the system logic 114 provides visibility into path selection by some or all of the path aggregation groups or path aggregation group logic in a network device 100.

In some implementations, the system logic 114 or another network management entity may tune a path aggregation group based on the evaluation of path selection data for one or more path aggregation groups of the network device 100 or other devices in a communication network. For example, the system logic 114 may tune the bandwidth of an underutilized or overutilized path, link, and/or device. As another example, the system logic 114 may adjust a path selection algorithm or logic for a path aggregation group, e.g., to address overutilization or underutilization of one or more paths in the path aggregation group or to meet path the selection performance criteria 124.

The methods, devices, and logic described above, including the system logic 114 and the group monitoring logic 220, may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The system, devices, and logic described above, including the system logic 114 and the group monitoring logic 220, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the systems and methods have been described, it will be apparent to those of ordinary skill in the art that many more embodiments and implementations are possible within the scope of the systems and methods. Accordingly, the systems and methods are not to be restricted except in light of the attached claims and their equivalents.

Various implementations have been specifically described. However, many other implementations are also possible.

What is claimed is:

1. A method comprising:
   in a network device:
   monitoring path selections for a path aggregation group in the network device by:
   selecting, for each of a plurality of network packets, one of a plurality of paths for communication through the path aggregation group;
   capturing, during a determined monitoring period, path selection data comprising a respective path selection indication of each of the network packets communicated through the path aggregation group; and
   updating, based on the path selection data, a path entry associated with each selected path in the path aggregation group to create path selection statistics for the path aggregation group during the determined monitoring period.

2. The method of claim 1, wherein the determined monitoring period comprises:
   a particular time period, following receipt of a control packet, during which network packets are selected for communication.

3. The method of claim 1, wherein the determined monitoring period comprises multiple non-consecutive time periods, during which network packets are selected for communication.

4. The method of claim 3, further comprising:
   capturing path selection data for the path aggregation group during the multiple non-consecutive time periods to create the path selection statistics; and
   evaluating the path selection statistics.

5. The method of claim 1, further comprising:
   identifying congestion in the network device by: determining that a fill level of a buffer has exceeded a congestion threshold, sending a pause frame, or sending an explicit congestion notification; and
   identifying the determined monitoring period for capturing path selection data as a particular time period based on identifying the congestion.

6. The method of claim 1, further comprising monitoring multiple path aggregation groups in the network device.

7. The method of claim 6, where the multiple path aggregation groups comprise path aggregation groups at different layers in the Open Systems Interconnection (OSI) model.

8. The method of claim 1, wherein updating the path entry comprises updating a packet count value indicating a number of packets communicated through each of the selected paths in the path aggregation group during the determined monitoring period.

9. The method of claim 1, wherein at least one of the plurality of paths for communication through the path aggregation group is a common path which also appears in another path aggregation group, and the step of updating the path entry associated with the common path to create path selection statistics for the path aggregation group comprises updating the path entry of the common path in the path aggregation group in response to the common path being selected from within the path aggregation group, and not updating the path entry of the common path in the path aggregation group in response to the common path being selected from within the another path aggregation group.

10. A device comprising:
a memory storing:
a path selection performance criterion; and
aggregation group monitoring logic in communication with the memory, the aggregation group monitoring logic operable to:
access the path selection performance criterion;
monitor path selection distribution decisions for each of a plurality of packets of network traffic communicated through a path aggregation group during a particular time interval to obtain path selection decision data for the path aggregation group within the particular time interval; and
evaluate the path selection decision data to determine when, during the particular time interval, the path selection distribution decisions for the path aggregation group failed to meet the path selection performance criterion.

11. The device of claim 10, wherein the path selection decision data is determined to fail the path selection performance criterion when network traffic distribution decisions to distribute packets to a first path in the path aggregation group exceeded network traffic distribution decisions to distribute packets to a second path in the path aggregation group by a threshold amount.

12. The device of claim 10, wherein the path selection decision data is determined to fail the path selection criterion when path selection distribution decisions to distribute packets to a path in the path aggregation group varies by more than a variance threshold from a target distribution.

13. The device of claim 10, where the particular time interval comprises multiple non-consecutive time periods.

14. The device of claim 10, wherein the aggregation group monitoring logic is further operable to:
obtain path selection decision data for multiple path aggregation groups; and
evaluate the path selection distribution decisions for the multiple path aggregation groups.

15. The device of claim 10, wherein the aggregation group monitoring logic is further operable to:
adjust a path selection algorithm for the path aggregation group based on evaluating the path selection distribution decisions performed with the path selection algorithm.

16. A device comprising:
a memory storing:
a first path aggregation group including a set of paths through which network traffic may be routed to a destination;
a plurality of path entries for each path in the set of paths, each of the path entries comprising path selection statistics for a different epoch of the first path aggregation group;
aggregation group monitoring logic in communication with the memory, the aggregation group monitoring logic operable to:
determine timing information associated with a first epoch and a second epoch;
collect, during a determined period of time corresponding to each of the first epoch and the second epoch, a plurality of path selection decision indications of respective network packets selected for communication through respective paths included in the first path aggregation group; and
update respective path entries of the respective paths to create separate path selection statistics for the first path aggregation group during each of the first epoch and the second epoch.

17. The device of claim 16, wherein the set of paths of the first path aggregation group is a first set of paths, and the memory further stores:
a second path aggregation group including a second set of paths, wherein a common path member is present in both the first set of paths and the second set of paths; and
a plurality of path entries for each path in the second set of paths; and
wherein the aggregation group monitoring logic is further operable to collect, during the determined period of time corresponding to each of the first epoch and the second epoch, path selection decision indications in a path entry for the common path in one of the first path aggregation group or the second path aggregation group within which the common path is selected.

18. The device of claim 17, where the aggregation group monitoring logic is further operable to:
evaluate the path selection decision indications for the common path to determine a first portion of network traffic communicated through the common path attributable to the first aggregation group and a second portion of the network traffic communicated through the common path attributable to the second path aggregation group.

19. The device of claim 16, wherein the first epoch and the second epoch are non-consecutive time periods.

20. The device of claim 16, wherein a first packet count value is stored for a respective path of the first path aggregation group for the first epoch, and a second packet count value is separately stored for the respective path of the first path aggregation group for the second epoch.

21. The device of claim 16, wherein a first bandwidth or total data value for a respective path in the first path aggregation group is stored for the first epoch, and a second bandwidth or total data value for the respective path of the first path aggregation group is separately stored during the second epoch.

* * * * *